United States Patent
Kiefer et al.

(10) Patent No.: US 9,493,116 B2
(45) Date of Patent: Nov. 15, 2016

(54) ALERT SYSTEMS AND METHODS FOR A VEHICLE

(71) Applicant: GM GLOBAL TECHNOLOGY OPERATIONS LLC, Detroit, MI (US)

(72) Inventors: Raymond J. Kiefer, Huntington Woods, MI (US); Charles A. Green, Canton, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 28 days.

(21) Appl. No.: 13/894,290

(22) Filed: May 14, 2013

(65) Prior Publication Data

US 2013/0342337 A1 Dec. 26, 2013

Related U.S. Application Data

(60) Provisional application No. 61/663,516, filed on Jun. 22, 2012.

(51) Int. Cl.
| | |
|---|---|
| *B60Q 9/00* | (2006.01) |
| *G06F 3/01* | (2006.01) |
| *B60W 50/16* | (2012.01) |
| *G08B 6/00* | (2006.01) |
| *B06B 1/16* | (2006.01) |
| *B60N 2/48* | (2006.01) |
| *B60N 2/44* | (2006.01) |

(52) U.S. Cl.
CPC ............... *B60Q 9/008* (2013.01); *B06B 1/16* (2013.01); *B60N 2/449* (2013.01); *B60N 2/48* (2013.01); *B60W 50/16* (2013.01); *G06F 3/016* (2013.01); *G08B 6/00* (2013.01); *B60N 2002/4485* (2013.01)

(58) Field of Classification Search
CPC ......... G08G 1/16; B60K 35/00; B60K 37/02
USPC ................................................. 340/438, 901
See application file for complete search history.

(56) References Cited

U.S. PATENT DOCUMENTS

| | | | |
|---|---|---|---|
| 5,432,509 | A | 7/1995 | Kajiwara |
| 5,890,083 | A | 3/1999 | Franke et al. |
| 6,127,944 | A | 10/2000 | Daly et al. |
| 6,289,332 | B2 | 9/2001 | Menig et al. |
| 6,345,179 | B1 | 2/2002 | Weigers et al. |

(Continued)

FOREIGN PATENT DOCUMENTS

| | | |
|---|---|---|
| CN | 101342874 A | 1/2009 |
| CN | 101391146 A | 3/2009 |

(Continued)

OTHER PUBLICATIONS

USPTO, U.S. Appl. No. 13/894,317, dated May 14, 2013.

(Continued)

*Primary Examiner* — Mohamed Barakat
(74) *Attorney, Agent, or Firm* — Lorenz & Kopf, LLP

(57) ABSTRACT

A method of alerting a driver of a vehicle is provided. The method includes: receiving alert settings configured by a user through a user interface; and selectively generating an alert pattern for at least one of a haptic alert device, an auditory alert device, and a visual alert device based on the alert settings.

18 Claims, 8 Drawing Sheets

(56) References Cited

U.S. PATENT DOCUMENTS

| | | | |
|---|---|---|---|
| 6,630,891 | B1 | 10/2003 | Dilling |
| 6,744,370 | B1 | 6/2004 | Sleichter, III et al. |
| 6,834,232 | B1 | 12/2004 | Malhotra |
| 7,095,315 | B2 | 8/2006 | Lemke |
| 7,170,400 | B2* | 1/2007 | Cowelchuk et al. ......... 340/438 |
| 7,245,231 | B2 | 7/2007 | Kiefer et al. |
| 7,369,042 | B2 | 5/2008 | Osaka et al. |
| 7,391,305 | B2* | 6/2008 | Knoll et al. .................. 340/438 |
| 7,515,066 | B2 | 4/2009 | Watanabe |
| 7,619,505 | B2 | 11/2009 | Kim |
| 8,013,720 | B2 | 9/2011 | Oelrich et al. |
| 8,305,200 | B2 | 11/2012 | Murphy et al. |
| 8,339,285 | B2 | 12/2012 | Boren et al. |
| 8,593,301 | B2 | 11/2013 | Newman |
| 8,669,857 | B2* | 3/2014 | Sun et al. ..................... 340/438 |
| 2003/0128182 | A1 | 7/2003 | Donath et al. |
| 2003/0229447 | A1 | 12/2003 | Wheatley et al. |
| 2003/0231163 | A1 | 12/2003 | Hanon et al. |
| 2004/0049232 | A1 | 3/2004 | Ideker et al. |
| 2004/0049323 | A1 | 3/2004 | Tijerina et al. |
| 2004/0073367 | A1 | 4/2004 | Altan et al. |
| 2004/0209594 | A1 | 10/2004 | Naboulsi |
| 2004/0252027 | A1* | 12/2004 | Torkkola et al. ............. 340/576 |
| 2005/0043864 | A1* | 2/2005 | Echtenkamp .................... 701/1 |
| 2005/0125153 | A1 | 6/2005 | Matsumoto et al. |
| 2005/0261815 | A1 | 11/2005 | Cowelchuk et al. |
| 2006/0255920 | A1 | 11/2006 | Maeda et al. |
| 2007/0001830 | A1* | 1/2007 | Dagci .................. B60K 31/185 340/438 |
| 2007/0109104 | A1 | 5/2007 | Altan et al. |
| 2008/0042813 | A1* | 2/2008 | Wheatley et al. ............ 340/435 |
| 2008/0085686 | A1 | 4/2008 | Kalik |
| 2008/0174415 | A1 | 7/2008 | Tanida et al. |
| 2008/0197901 | A1 | 8/2008 | Cruz-Hernandez et al. |
| 2008/0201039 | A1 | 8/2008 | Matsuoka et al. |
| 2009/0015045 | A1 | 1/2009 | Nathan et al. |
| 2009/0079690 | A1 | 3/2009 | Watson et al. |
| 2009/0232320 | A1 | 9/2009 | Azizi et al. |
| 2010/0114467 | A1 | 5/2010 | Samuel et al. |
| 2010/0201508 | A1* | 8/2010 | Green et al. .................. 340/435 |
| 2010/0274438 | A1 | 10/2010 | Egami |
| 2010/0295707 | A1 | 11/2010 | Bennie et al. |
| 2011/0001616 | A1 | 1/2011 | Nathan et al. |
| 2011/0066325 | A1 | 3/2011 | Lu et al. |
| 2011/0169626 | A1 | 7/2011 | Sun et al. |
| 2011/0187518 | A1 | 8/2011 | Strumolo et al. |
| 2011/0316686 | A1 | 12/2011 | Matsuno et al. |
| 2012/0081234 | A1 | 4/2012 | Shaffer et al. |
| 2012/0154156 | A1 | 6/2012 | Kuntzel |
| 2012/0212353 | A1 | 8/2012 | Fung et al. |
| 2012/0269358 | A1 | 10/2012 | Gee et al. |
| 2012/0283939 | A1 | 11/2012 | Bobbitt, III |
| 2013/0009789 | A1 | 1/2013 | Ichikawa |
| 2013/0325313 | A1 | 12/2013 | Kim et al. |
| 2014/0232534 | A1 | 8/2014 | Birnbaum et al. |

FOREIGN PATENT DOCUMENTS

| | | |
|---|---|---|
| CN | 101678819 A | 3/2010 |
| CN | 101728942 A | 6/2010 |
| CN | 101927740 A | 12/2010 |
| CN | 101968910 A | 2/2011 |
| CN | 101973210 A | 2/2011 |
| CN | 201749540 U | 2/2011 |
| CN | 201932077 U | 8/2011 |
| CN | 202071799 U | 12/2011 |
| GB | 2414304 A | 11/2005 |
| JP | 2012006518 A | 1/2012 |
| WO | 2009134525 A1 | 11/2009 |
| WO | 2011062869 A1 | 5/2011 |

OTHER PUBLICATIONS

USPTO, U.S. Appl. No. 13/894,322, dated May 14, 2013.
USPTO, U.S. Appl. No. 13/894,345, dated May 14, 2013.
USPTO, U.S. Appl. No. 13/894,347, dated May 14, 2013.
USPTO, U.S. Appl. No. 13/894,294, dated May 14, 2013.
USPTO, U.S. Appl. No. 13/894,297, dated May 14, 2013.
USPTO, U.S. Appl. No. 13/894,302, dated May 14, 2013.
USPTO, U.S. Appl. No. 13/894,307, dated May 14, 2013.
USPTO, U.S. Appl. No. 13/894,308, dated May 14, 2013.
USPTO, Office Action for U.S. Appl. No. 13/894,322 mailed Feb. 3, 2015.
USPTO, Final Office Action for U.S. Appl. No. 13/894,347 mailed Feb. 5, 2015.
USPTO, Office Action for U.S. Appl. No. 13/894,317 mailed Dec. 10, 2014.
USPTO, Office Action for U.S. Appl. No. 13/894,302 mailed Dec. 10, 2014.
USPTO, Office Action for U.S. Appl. No. 13/894,294, mailed Jan. 2, 2015.
USPTO, Notice of Allowance for U.S. Appl. No. 13/894,297, mailed Jan. 7, 2014.
USPTO, Office Action for U.S. Appl. No. 13/894,308, mailed Dec. 3, 2014.
USPTO, Office Action for U.S. Appl. No. 13/894,347, mailed Oct. 21, 2014.
State Intellectual Property Office of the People's Republic of China, Office Action in Chinese Patent Application No. 201310343668.1 mailed Apr. 8, 2015.
USPTO, Final Office Action for U.S. Appl. No. 13/894,308 mailed Mar. 17, 2015.
USPTO, Final Office Action for U.S. Appl. No. 13/894,302 mailed Mar. 18, 2015.
USPTO, Notice of Allowance and Fee(s) due for U.S. Appl. No. 13/894,317 mailed Apr. 1, 2015.
USPTO, Office Action for U.S. Appl. No. 13/894,307 mailed Apr. 17, 2015.
USPTO, Notice of Allowance and Fee(s) Due for U.S. Appl. No. 13/894,294 mailed May 11, 2015.
State Intellectual Property Office of the People's Republic of China, Office Action in Chinese Patent Application No. 201310498497.X mailed Apr. 13, 2015.
State Intellectual Property Office of the People's Republic of China, Office Action in Chinese Patent Application No. 201310248857.0 mailed May 6, 2015.
State Intellectual Property Office of the People's Republic of China, Office Action in Chinese Patent Application No. 201310249780.9 mailed Jun. 3, 2015.
State Intellectual Property Office of the People's Republic of China, Office Action in Chinese Patent Application No. 201310249842.6 mailed Jun. 18, 2015.
USPTO, Office Action for U.S. Appl. No. 13/894,345 mailed Jun. 29, 2015.
State Intellectual Property Office of the People's Republic of China, Office Action in Chinese Patent Application No. 201310249799.3 mailed Sep. 14, 2015.
USPTO, Office Action in U.S. Appl. No. 13/894,308 mailed Oct. 6, 2015.
USPTO, Office Action in U.S. Appl. No. 13/894,302 mailed Oct. 7, 2015.
USPTO, Final Office Action in U.S. Appl. No. 13/894,345 mailed Oct. 8, 2015.
USPTO, Notice of Allowance and Fee(s) Due in U.S. Appl. No. 13/894,347 mailed Oct. 16, 2015.
USPTO, Final Office Action in U.S. Appl. No. 13/894,307 mailed Nov. 3, 2015.
USPTO, Response to Office Action in U.S. Appl. No. 13/894,307 mailed Jul. 7, 2015.
USPTO, Response to Office Action in U.S. Appl. No. 13/894,345 mailed Sep. 25, 2015.
USPTO, Final Office Action in U.S. Appl. No. 13/894,302 mailed Jan. 29, 2016.

(56) References Cited

OTHER PUBLICATIONS

USPTO, Notice of Allowance and Fee(s) Due in U.S. Appl. No. 13/894,345 mailed Feb. 1, 2016.
USPTO, Final Office Action in U.S. Appl. No. 13/894,308 mailed Feb. 1, 2016.
USPTO, Office Action in U.S. Appl. No. 13/894,307 mailed Feb. 3, 2016.
State Intellectual Property Office of the People's Republic of China, Office Action in Chinese Patent Application No. 201310248857.0 mailed Jun. 3, 2016.
Chinese Patent and Trade Mark Office, Office Action for Chinese Patent Application No. 201310343668.1, mailed on Aug. 15, 2016.
USPTO, Office Action for U.S. Appl. No. 13/894,308, mailed Sep. 14, 2016.

* cited by examiner

ALERT SYSTEMS AND METHODS FOR A VEHICLE

CROSS REFERENCE TO RELATED APPLICATIONS

This application claims the benefit of U.S. Provisional Application No. 61/663,516, filed Jun. 22, 2012 which is incorporated herein by reference in its entirety.

TECHNICAL FIELD

The technical field generally relates to driver alert systems and methods, and more particularly relates to control methods and systems for driver alert systems of a vehicle.

BACKGROUND

Collision avoidance systems warn drivers of potential collision threats that may be in the line-of-sight of the driver (e.g., detected by on-board vehicle sensors) or out of the line-of-sight of the driver (e.g., determined from wireless vehicle-to-vehicle communications and/or vehicle-to-infrastructure communications). Collision avoidance systems may generate visual, auditory, or haptic alerts to warn a vehicle driver of the potential collision threats. Typically, the collision avoidance systems are implemented as separate systems. Thus, alerts may be generated by some collision avoidance systems without regard to alerts that are generated by other collision avoidance systems. If more than one alert is generated to the vehicle driver at any one time, the multiple alerts might have the potential to distract the driver from avoiding the collision.

Accordingly, it is desirable to provide methods and systems for coordinating the alerting of the driver of the vehicle using any combination of the auditory, visual, and haptic alerts. Furthermore, other desirable features and characteristics of the present invention will become apparent from the subsequent detailed description and the appended claims, taken in conjunction with the accompanying drawings and the foregoing technical field and background.

SUMMARY

A method of alerting a driver of a vehicle is provided. In one embodiment, the method includes: receiving alert settings configured by a user through a user interface; and selectively generating an alert pattern for at least one of a haptic alert device, an auditory alert device, and a visual alert device based on the alert settings.

A control system is provided for alerting a driver of a vehicle. In one embodiment, the system includes a first module that receives alert settings configured by a user through a user interface. A second module that generates an alert pattern for at least one of a haptic alert device, an auditory alert device, and a visual alert device based on the alert settings.

A vehicle is provided. In one embodiment, the vehicle includes at least one collision avoidance system that generates conditions data. A control module receives the conditions data, receives alert settings configured by a user through a user interface, and generates an alert pattern for at least one of a haptic alert device, an auditory alert device, and a visual alert device based on the alert settings and the conditions data.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
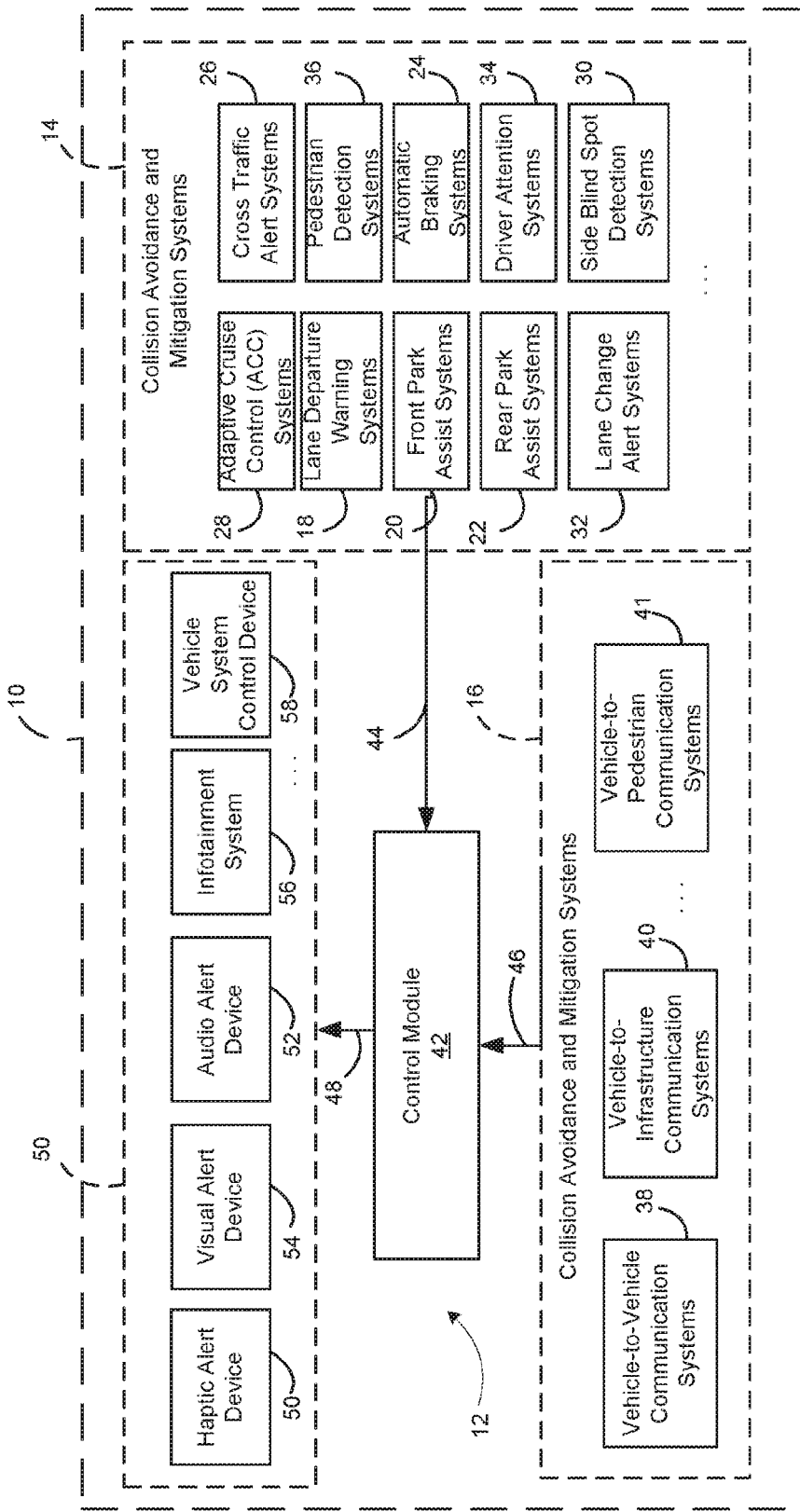
FIG. 1 is a functional block diagram illustrating a vehicle that includes a driver alert system in accordance with exemplary embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle 10 is shown having a driver alert system 12 in accordance with various embodiments. The driver alert system 12 is associated with one or more collision avoidance systems 14, 16 of the vehicle 10. The driver alert system 12 generally alerts a driver of one or more conditions that are detected and indicated by the collision avoidance system(s) 14, 16 in accordance with various embodiments. Although the figures shown herein depict example arrangements of elements, additional intervening elements, devices, features, or components may be present in actual embodiments. It should also be understood that FIG. 1 is merely illustrative and may not be drawn to scale.

As shown, the vehicle 10 includes one or more line-of-sight collision avoidance or mitigation systems 14, and one or more non-line-of-sight collision avoidance or mitigation systems 16. The line-of-sight collision avoidance systems 14 generally include one or more on-board vehicle sensors (not shown) (e.g., camera, radar, and/or lidar) communicatively coupled to a control module (not shown) that detect a potential for a collision based on the vehicle sensor signals. Exemplary line-of-sight collision avoidance systems 14 include, but are not limited to, lane departure warning or lanekeeping assist systems 18, front park assist systems 20, rear park assist systems 22, front and rear automatic braking systems 24, rear cross traffic alert systems 26, adaptive cruise control (ACC) systems 28, side blind zone (or spot) detection systems 30, lane change alert systems 32, driver attention (e.g., distraction- and/or drowsiness-monitoring) systems 34, and front and rear pedestrian detection systems 36.

The non-line-of-sight collision avoidance systems 16 generally include one or more communication systems or devices (not shown) that can determine or forecast a potential collision. Exemplary non-line-of-sight collision avoidance systems include, but are not limited to, vehicle communication systems that communicate between the vehicle 10 and other vehicles (not shown) (e.g., vehicle-to-vehicle communication systems 38), vehicle communication systems that communicate between the vehicle 10 and an infrastructure (not shown) (e.g., vehicle-to-infrastructure communication systems 40) and vehicle communication systems that communicate between the vehicle 10 and an pedestrians/cyclists (e.g., vehicle-to-pedestrian communication systems 41) to forecast potential collisions due to traffic. As can be appreciated, in various embodiments, any one of the line-of-sight collision avoidance systems 14 or the non-line-of sight collision avoidance systems 16 can include both vehicle sensors and communication systems to detect activity either inside the line-of-sight of the driver or outside of the line-of-sight of the driver.

A control module 42 receives signals 44, 46 from the various collision avoidance systems 14, 16 indicating one or more potential collision conditions. As can be appreciated, in various other embodiments, the control module 42 may be integrated with other control modules (not shown) of the vehicle 10, and/or may be implemented separately for each collision avoidance system 14, 16. The control module 42 may also be a plug-in device that is installed into an onboard diagnostics connector of the vehicle (OBD-II), a retrofit module that is collocated with an existing vehicle module (i.e., installed at the host module using an adaptation connector), or as a replacement part for an existing vehicle system (i.e., inside rear-view mirror assembly). The control module 42 may also be a wireless device that is communicatively couples to the vehicle 10 over a short range wireless connection such as Wi-Fi, Bluetooth, NFC or similar.

The control module 42 generates control signals 48 to alert devices and/or control devices 50 such that a driver can be alerted of the condition and/or such that vehicle functions can be performed to minimize or prevent the collision. In various embodiments, the alert devices can include, one or more haptic alert devices 50 (e.g., one or more haptic alert devices of a vehicle seat assembly, one or more haptic alert devices of a steering wheel assembly, etc.), one or more auditory alert devices 52 (e.g., warning chimes or beeps, etc.), one or more visual alert devices 54 (e.g., warning lamps, an information center, a screen of an infotainment system, LED panel, head-up display, display reflected off windshield, etc.), and auditory, visual, and haptic devices of an infotainment system 56. The control devices can include, but are not limited to, a vehicle system control device 58 that performs vehicle braking, vehicle system control device 58 that adjusts the torque or position of the vehicle steering, or other driving maneuvers. In various embodiments, the control module 42 coordinates the generation of the control signals 48 such that the alerts alert the driver in a way that does not distract the driver from avoiding the collision.

Figure 2:
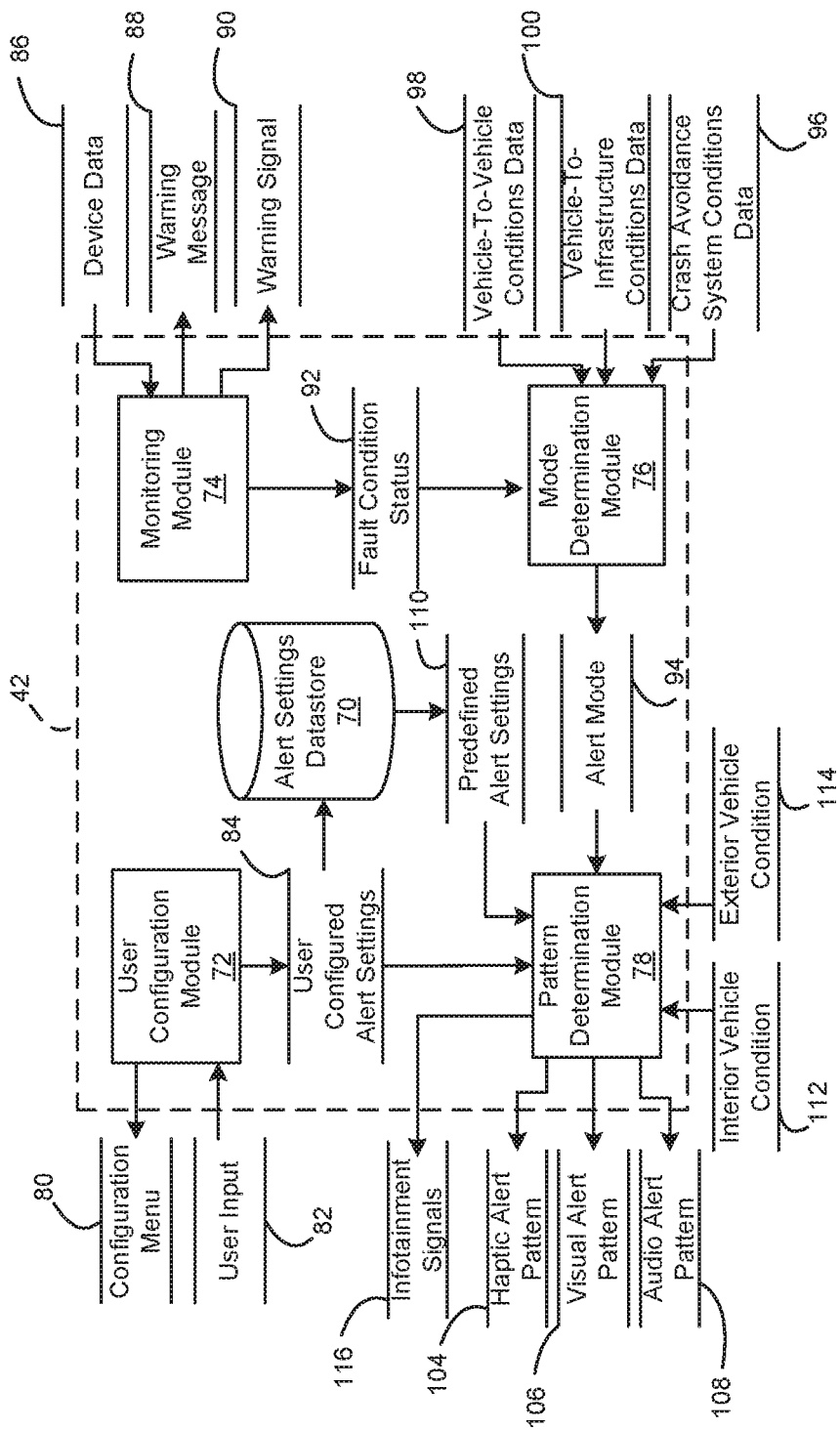
FIG. 2 is a dataflow diagram illustrating an alert control system of the driver alert system in accordance with exemplary embodiments.

Referring now to FIG. 2 and with continued reference to FIG. 1, a dataflow diagram illustrates various embodiments of an alert control system that may be embedded within the control module 42. Various embodiments of alert control systems according to the present disclosure may include any number of sub-modules embedded within the control module 42. As can be appreciated, the sub-modules shown in FIG. 2 may be combined and/or further partitioned to similarly coordinate and provide driver alerts and/or request vehicle functions to be performed.

In various embodiments, inputs to the alert system may be sensed from the vehicle 10, received from other control modules (not shown) within the vehicle 10 (e.g., through a vehicle communication bus or an intra-vehicle wireless communication), received from modules remote from the vehicle 10 (e.g., through inter-wireless communication or cellular communication), received from one or more sensors (not shown) of the vehicle 10, and/or determined/modeled by other sub-modules (not shown) within the control module 42. In various embodiments, the control module 42 includes an alert settings datastore 70, a user configuration module 72, a monitoring module 74, a mode determination module 76, and a pattern determination module 78. In various embodiments, the alert settings datastore 70 may reside in a local vehicle module, in a plug-in vehicle accessory device, in user-removable storage (e.g., USB flash drive, Secure Digital SD, etc.), in the storage of a user accommodated device (e.g., consumer smartphone or key fob that is wirelessly paired to the vehicle 10), or in a cloud database. For exemplary purposes, the alert settings datastore 70 is described as being a part of the control module 42.

The alert settings datastore 70 stores predefined alert settings and/or user configured alert settings, as will be discussed in more detail below. As can be appreciated, the alert settings datastore 70 can include volatile memory that temporarily stores the settings, non-volatile memory that stores the settings across key cycles, or a combination of volatile and non-volatile memory.

The user configuration module 72 manages the display of a configuration menu 80, and manages user input 82 received from a user interacting with the configuration menu 80. As can be appreciated, the configuration menu 80 can be displayed on a display device within the vehicle 10 (e.g., via an information center), can be displayed on a display device that is remote from the vehicle 10 (e.g., a computing device or personal handheld device), or can be displayed on a device connected to the vehicle 10 (e.g., a technician tool).

In various embodiments, the configuration menu 80 may be implemented as a main menu with one or more sub-menus. Each menu or sub-menu includes selectable options that, when selected, allow a user to configure various alert settings associated with the haptic alert devices 50, the auditory alert devices 52, the visual alert devices 54, and/or the infotainment system 56. The alert settings for the haptic alert devices 50 can include, but are not limited to, an occurrence of the vibration (e.g., whether or not to perform the vibration for a particular mode), a location of the vibration (e.g., at a particular location on seat or other haptic device), an intensity of the vibration, a duration of the vibration, a rate of the vibration, and/or a frequency of the pulses of the vibration. The alert settings for the auditory alert devices 52 can include, but are not limited to, an occurrence of the auditory alert (e.g., whether or not to perform the auditory alert), a sound level of the auditory alert, a sound type of the auditory alert (e.g., a particular narrow-band chime or broadband auditory warning signal), a duration of the auditory alert, a rate of the auditory alert, and/or a frequency of sounds of the auditory alert. The alert settings for the visual alert devices 54 can include, but are not limited to, an occurrence of the visual alert (e.g., whether or not to perform the visual alert), a location of the visual alert (e.g., whether on a heads up display, an LED panel, or other visual alert device), a visual type of the visual alert (e.g., a particular color or symbol), a duration of the visual alert, a rate of the visual alert, and/or a frequency of visuals of the visual alert.

The alert settings for the infotainment system 56 can include, but are not limited to, an occurrence of an auditory muting, haptic feedback, or pattern display (e.g., whether or not to perform the auditory muting, the haptic feedback, and/or pattern display for a particular mode), and a type of auditory muting, haptic feedback, or pattern display that should be applied. For example, a rapid pulsing pattern may be transmitted via the finger making contact with a touch screen when a collision may be imminent. In another example, the radio can be intelligently muted based on interior vehicle conditions indicating a volume level of the infotainment system 56.

In various embodiments, the configuration menu 80 allows the alert settings to be configured for alert types such as individual alert conditions, certain types or groups of alert conditions, particular driving scenarios, and/or for particular vehicle conditions. The individual alert conditions can include, but are not limited to, conditions associated with the various collision avoidance systems. The particular driving scenarios can include, but are not limited to, vehicle occupancy type conditions (e.g., as determined based on seatbelt signals, or seat compression signals, number of consumer device pairings, number of consumer devices discovered, rear seat entertainment system usage, passenger door opening/closing inferences, etc.), ambient conditions (such as day or night, or weather conditions, which for example, can be derived from wiper usage and outside air temperature), driver self-rated attention, distraction, or drowsy state (e.g., high, medium, or low), and a type of road that the vehicle is traveling on based on a digital map information (e.g., unique settings may be configured for different types of road classes: residential, arterial, highway, limited access, etc.). As can be appreciated, other map attributes such as posted speed limits may also be used (e.g., specific settings may apply based on the current posted speed limit). The digital map database may reside inside an embedded vehicle module, on a customer device, or on a remote server (which may be accessed in real time or accessed as a downloaded datastore). The vehicle conditions can include, but are not limited to, when the vehicle is experiencing a severe system malfunction (e.g., a specific device trouble code has activated or the driver has engaged the vehicle hazard lights).

The type or groups of alert conditions may include a grouping or type of any of the alert conditions, driving scenarios, and vehicle conditions and can include, but are not limited to, parking type conditions versus driving type (non-parking) conditions, and various collision threat conditions (e.g., minor threats verses imminent threats, and various threat levels there between). In various embodiments, alert conditions may also be configured to be specific to an identity of the current driver (e.g., the identity can be determined based on a current keyfob or driver memory seat selection, or driver identity based on a prioritized paired device).

Figure 3:
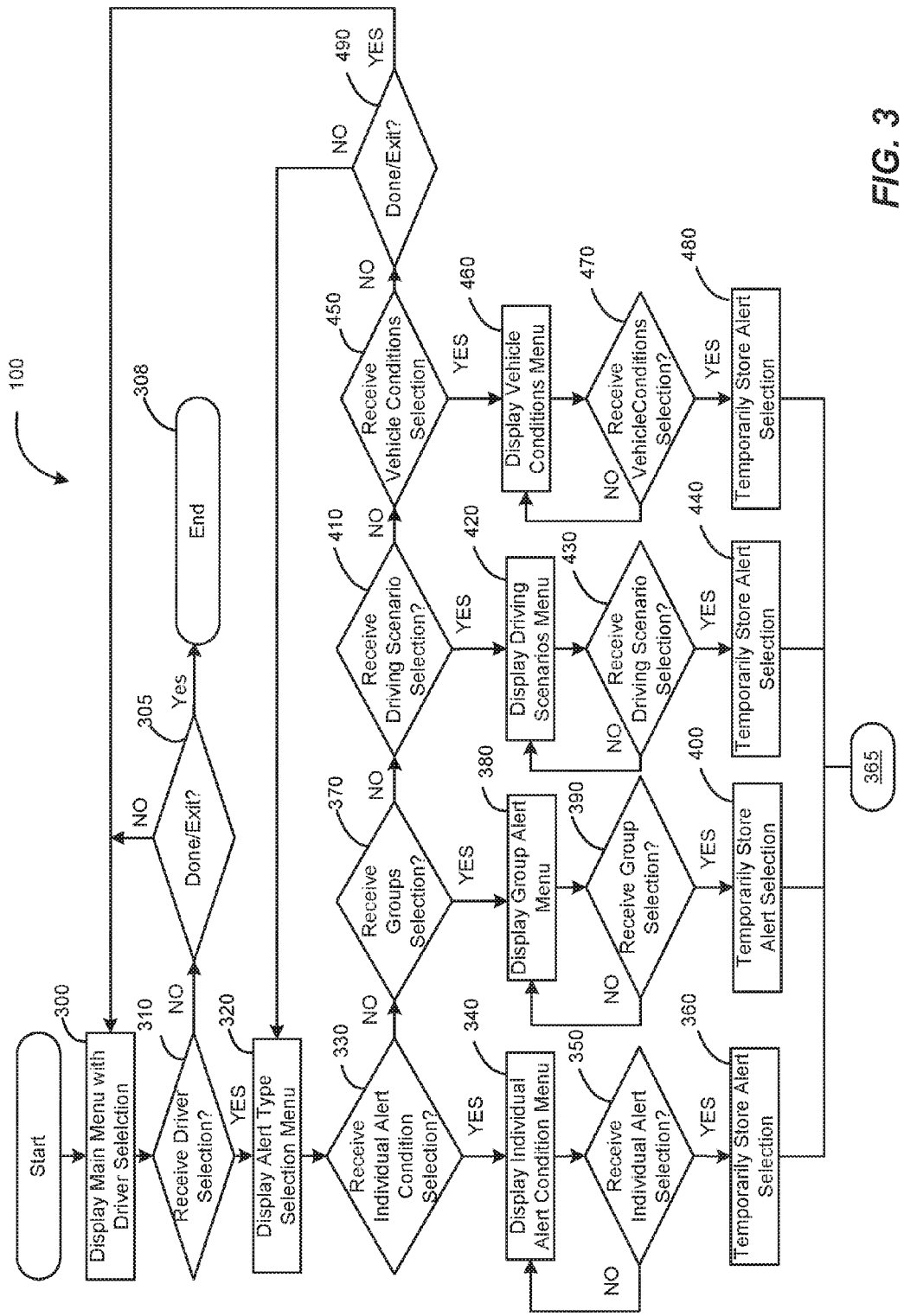
FIGS. 3-8 are flowcharts illustrating alert methods that may be performed by the alert systems in accordance with exemplary embodiments.
Figure 4:
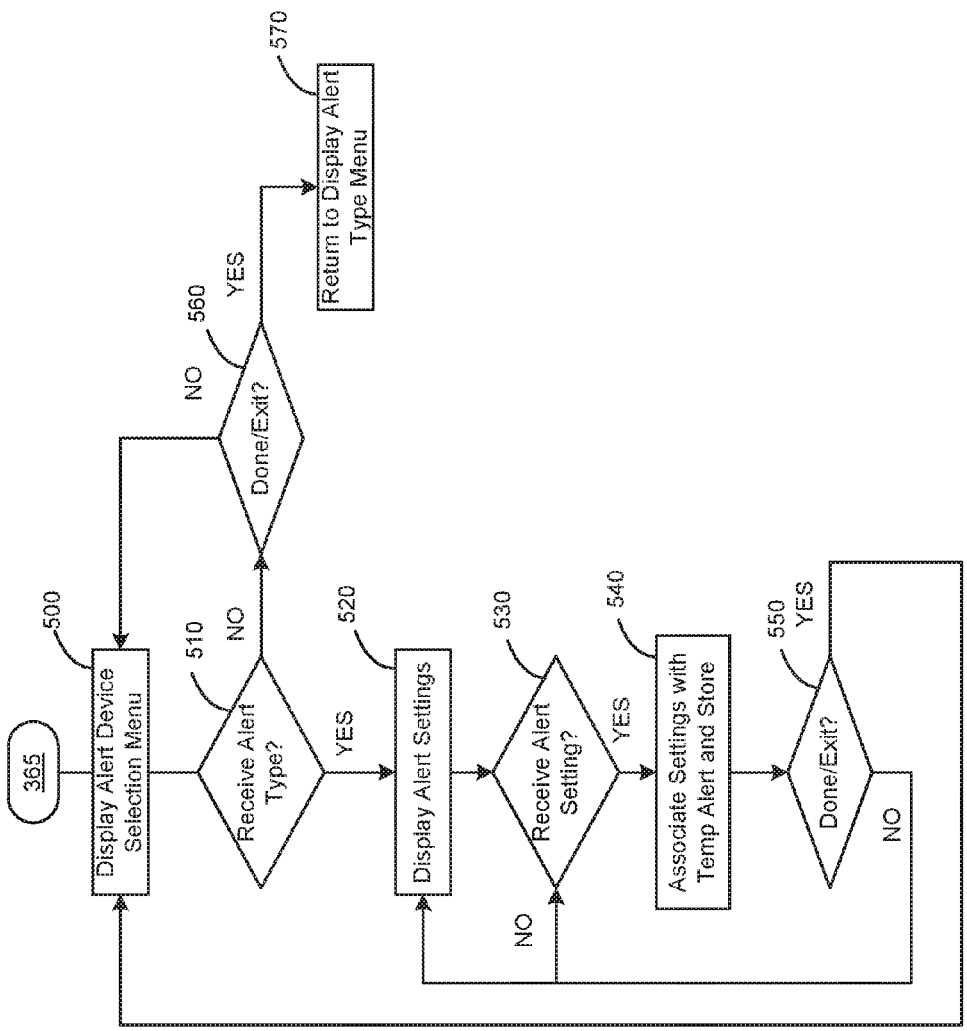

Based on the user input 82 received from the user interacting with the configuration menu 80 (e.g., via one or more user input devices), the user configuration module 72 stores the user configured alert settings 84 in the alert settings datastore 70. For example, as shown in the exemplary flowcharts of FIGS. 3 and 4 and with continued reference to FIG. 2, a driver selection menu is displayed requesting selection of a particular driver at 300. If a driver selection is not received at 310, it is determined with the user input 82 indicates to exit the driver selection menu at 305. If the user input 82 indicates to exit the driver selection menu at 305, the driver selection menu is exited and the method may end at 308.

If, however, the user input does not indicate to exit the driver selection menu at 305, the driver selection menu is displayed at 300. Upon receipt of user input 82 indicating a driver selection at 310, an alert type selection menu is displayed requesting selection of a particular alert type at 320. For example, the alert type may be an alert condition type, a group of alert conditions type, a driving scenario type, or a vehicle condition type.

If the user input 82 indicates that an alert condition type is selected at 330, an alert condition selection menu is displayed requesting selection of a particular alert condition at 340. Upon receipt of user input 82 indicating a selection of a particular alert condition at 350, the particular alert condition is temporarily stored at 360. Thereafter, the method continues at 365.

If, at 370, the user input 82 indicates that a group of alert conditions type is selected, a group of alert conditions selection menu is displayed requesting selection of a particular group or type of alert conditions at 380. Upon receipt of user input 82 indicating a selection of a particular group or type of alert conditions at 390, the particular group or type of alert conditions is temporarily stored at 400. Thereafter, the method continues at 365.

If, at 410, the user input 82 indicates that a driving scenario type is selected, a driving scenarios selection menu is displayed requesting selection of a particular driving scenario at 420. Upon receipt of user input 82 indicating a selection of a particular driving scenario at 430, the particular driving scenario is temporarily stored at 440. Thereafter, the method continues at 365.

If, at 450, the user input 82 indicates that a vehicle conditions type is selected, a vehicle conditions selection menu is displayed requesting selection of a particular vehicle condition at 460. Upon receipt of user input 82 indicating a selection of a particular vehicle condition at 470, the particular vehicle condition is temporarily stored at 480. Thereafter, the method continues at 365.

If, at 490, the user input 82 indicates to exit the alert type selection menu, the driver selection menu is displayed at 300. Otherwise, the alert type selection menu is displayed at 320.

After 365 (in FIG. 4), an alert device selection menu is displayed requesting selection of a particular alert device (e.g., a haptic device, an auditory device, a visual device, an infotainment system, etc.) at 500. Upon receipt of user input 82 indicating a selection of a particular alert device at 510, an alert settings selection menu is displayed requesting selection of a particular alert setting at 520. Upon receipt of user input 82 indicating a selection of a particular alert setting at 530, the particular alert setting is associated with the temporarily stored alert type at 540.

If, at 550, the user input 82 indicates to exit the alert settings selection menu, the alert device selection menu is displayed at 500. Otherwise, the alert settings selection menu is displayed at 520. If at 510, the user input 82 does not indicate an alert type and the user input 82 does not indicate to exit the alert device menu at 560, the alert device selection menu is displayed at 500. If, however, the user input 82 does not indicate an alert type at 510 rather, the user input indicates to exit the alert device selection menu at 560, the method returns to 320 to display the alert type selection menu at 570. As can be appreciated, the method may iterate until the user has completed configuration of the selected alert settings and has exited the driver selection menu.

With reference back to FIG. 2, the monitoring module 74 monitors input data 86 associated with the alert devices 50-56 to determine whether the alert devices 50-56 are operating properly. If the monitoring module 74 determines that one or more of the alert devices 50-56 is not operating properly (i.e., malfunctioning), the monitoring module 74 generates a warning message 88, generates a warning signal 90, and/or generates a fault condition status 92 that can be evaluated by the mode determination module 76. The fault condition status 92 may indicate a type of fault and the particular faulty device.

In various embodiments, the warning message 88 may include a diagnostic code that indicates a fault of the alert device 50-56. The warning message 88 may be communicated to an occupant of the vehicle 10 (e.g., via an information center of the vehicle 10), may be communicated to a remote location (e.g., via a telematics system of the vehicle 10), may be communicated to an accommodated or plug-in device, and/or may be retrieved by a technician (e.g., via a technician tool that communicatively couples to a communication bus of the vehicle 10). In various embodiments, the warning signal 90 is a control signal that activates an alert device 50-56 other than the device that contains the fault. For example, the warning signal 90 can be a visual alert device 54 of the vehicle 10, can be a control signal that activates an auditory alert device 52 of the vehicle 10, and/or can be a control signal that activates a haptic alert device 50.

The mode determination module 76 determines a current alert mode 94 based on various vehicle conditions indicated by the signals 44, 46. The vehicle conditions are conditions that may require an alert to the driver and can be received from the various line-of-sight collision avoidance systems 14 (FIG. 1) as collision avoidance system conditions data 96, can be received from the non-line-of-sight collision avoidance systems 16 as vehicle-to-vehicle conditions data 98, and/or as vehicle-to-infrastructure conditions data 100 and/or vehicle-to-pedestrian conditions data 41. Based on the conditions data 96-100, the mode determination module 76 sets the alert mode 94 to indicate one or more alert conditions, one or more vehicle conditions, and/or one or more driving scenarios. In various embodiments, the mode determination module 76 may set the alert mode 94 (e.g., to an override mode) based on a determination of an imminent collision threat indicated by one of the systems 14, 16 (FIG. 1).

In various embodiments, the mode determination module 76 may determine that the conditions data 96-100 present multiple alert modes 94. In such a case, the mode determination module 76 generates the multiple alert modes or, alternatively, arbitrates between the alert modes based on a priority scheme to generate a single alert mode 94, or alternatively, arbitrates between the alert modes to create a combined alert. In various embodiments, the mode determination module 76 monitors the fault condition status 92 of the alert devices. 50-56 (FIG. 1). The mode determination module 76 sets the alert mode 94 based on the fault condition status 92. For example, if the fault condition status 92 indicates a fault of the haptic device 50 (FIG. 1), the mode determination module 76 may set the alert mode 94 to an override mode.

Figure 5:
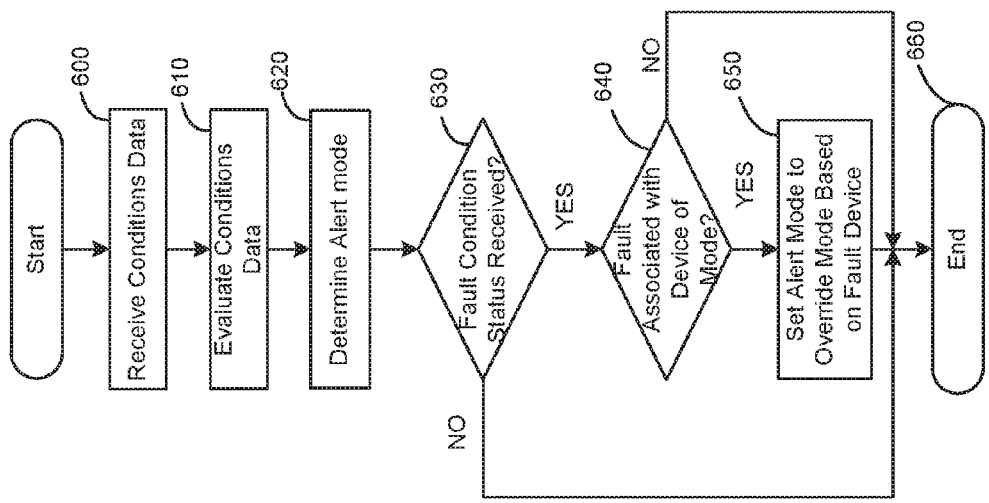

For example, as shown in the flowchart of FIG. 5 and with continued reference to FIG. 2, the conditions data 96-100 is received at 600. The conditions data 96-100 is evaluated at 610 and the alert mode 94 (or modes) is determined at 620. Based on the evaluation, the alert mode 94 can indicate one or more alert conditions, one or more driving scenarios, and/or one or more vehicle conditions.

It is determined whether a fault condition status 92 has been received at 630. If a fault condition status 92 has not been received at 630, or the fault condition status 92 indicates that the fault is not a fault of an alert device 50-56 (FIG. 1) that is associated with the alert mode 94, the method may end at 660. If, however, a fault condition status 92 is received at 630, and the fault condition status 92 indicates a fault of an alert device 50-56 (FIG. 1) associated with the alert mode 94 at 640, the alert mode 94 is set to an override mode based on the faulty device at 650. Thereafter, the method may end at 660.

With reference back to FIG. 2, the pattern determination module 78 determines one or more alert patterns based on the alert mode 94. The alert patterns include haptic alert patterns 104, visual alert patterns 106, and/or auditory alert patterns 108 that are used by the haptic alert devices 50 (FIG. 1), the visual alert devices 54 (FIG. 1), the auditory alert devices 52 (FIG. 1), and/or the infotainment system 56 (FIG. 1) to generate the alerts. Depending on the type of pattern (e.g., haptic, visual, and/or audio), the patterns may indicate a location or locations of the alert within the alert device 50-56 (e.g., a vibration at a particular location or locations on seat or other haptic device), an auditory type of the alert (e.g., a particular chime), a visual type of the alert (e.g., a particular color or symbol) an intensity of the alert, a duration of the alert, a rate of the alert and/or a frequency of vibration pulses, visuals, or sounds of the alert.

Figure 6:
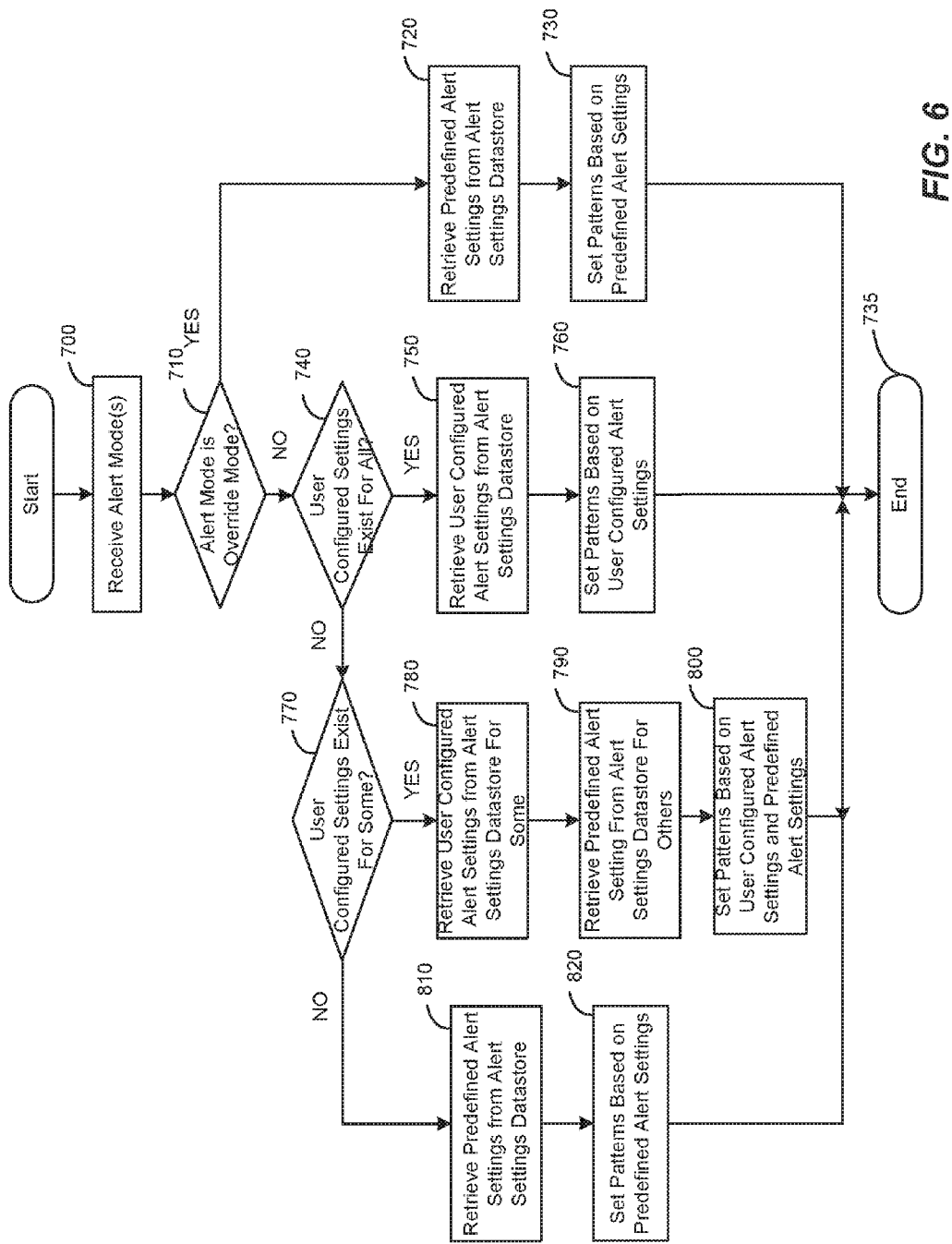

In various embodiments, the pattern determination module 78 determines the alert patterns 104-108 for a particular device by retrieving predefined alert settings 110, and/or the user configured alert settings 84 from the alert settings datastore 70. The alert settings 84, 110 are retrieved based on the alert mode 94. For example, as shown in the flowchart of FIG. 6 and with continued reference to FIG. 2, one or more alert modes 94 are received (for ease of the discussion the method will be discussed in the context of a single alert mode 94) at 700.

If the alert mode 94 is an override mode at 710, predefined alert settings 110 associated with the particular override mode are retrieved from the alert settings datastore 70 at 720 and one or more of the alert patterns 104-108 are set based on the predefined alert settings 110 at 730. Thereafter, the method may end at 735.

If, however, the alert mode 94 is not an override mode at 710, and user configured alert settings 84 exist for all of the one or more alert conditions, vehicle conditions, or driving scenarios of the alert mode 94 at 740, the user configured alert setting 84 are retrieved from the alert settings datastore 70 at 750. One or more of the alert patterns 104-108 are set based on the user configured alert settings 84 at 760. Thereafter, the method may end at 735.

If the alert mode 94 is not an override mode at 710, and user configured alert settings 84 do not exist for all of the one or more alert conditions, vehicle conditions or driving scenarios of the alert mode 94 at 740, however user configured alert settings 84 exist for some (but not all) of the one or more alert conditions, vehicle conditions, or driving scenarios at 770, the user configured alert settings 84 are retrieved for the alert conditions, vehicle conditions, or driving scenarios in which they exist at 780, and the predefined alert settings 110 are retrieved for the remaining alert conditions, vehicle conditions, or driving scenarios at 790. One or more alert patterns 104-108 are set based on the user configured alert settings 84 and the predefined alert settings 110 at 800. Thereafter, the method may end at 735.

If the alert mode 94 is not an override mode at 710, and user configured alert settings 84 do not exist for all of the one or more alert conditions, vehicle conditions, or driving scenarios at 740, and in fact they do not exist for any of the one or more alert conditions, vehicle conditions, or driving scenarios at 770, the predefined alert settings 110 are retrieved for the alert conditions, vehicle conditions, or driving scenarios of the alert mode 94 at 810, and one or more alert patterns 104-108 are set based on the predefined alert settings 110 at 820. Thereafter, the method may end at 735.

With reference back to FIG. 2, when the alert mode 94 indicates multiple alert conditions, vehicle conditions, and/or driving scenarios that are associated with multiple patterns, the pattern determination module 78 coordinates the alert patterns 104-108 before being generated. In various embodiments, the pattern determination module 78 coordinates the alert patterns 104-108 by synchronizing a timing of the patterns, arbitrating between patterns, and/or combining patterns into a single pattern. In various embodiments, the pattern determination module 78 coordinates the alert patterns 104-108 based on whether the alert patterns 104-108 are associated with the same alert device 50-56 (FIG. 1) or with different alert devices 50-56 (FIG. 1).

Figure 7:
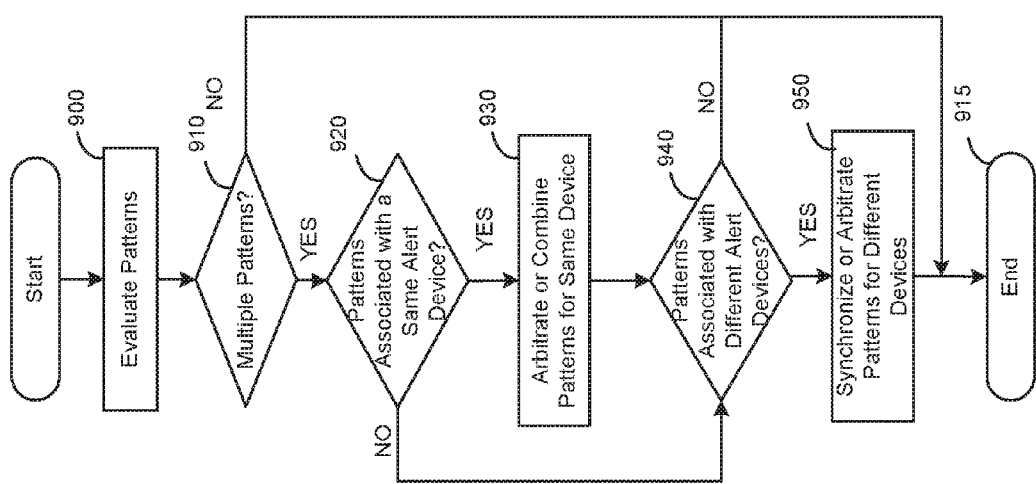

For example, as shown in FIG. 7 and with continued reference to FIG. 2, the alert patterns 104-108 are evaluated at 900. If multiple alert patterns do not exit at 910, the method may end at 915. If, however, multiple alert patterns 104-108 exist at 910, it is determined whether any of the alert patterns 104-108 are associated with a same alert device 50-56 (FIG. 1) at 920. If alert patterns 104-108 are associated with a same alert device 50-56 (FIG. 1) at 920, the alert patterns 104-108 are arbitrated or combined for each same alert device 50-56 (FIG. 1) at 930 before being generated.

For example, the alert patterns 104-108 can be arbitrated based on a predefined priority scheme to determine a preferred pattern. In another example, the alert patterns 104-108 can be combined or added to create unique, superimposed, and/or summative patterns without the need for arbitration. In various embodiments, the combined patterns may be combined for all or part of the alert depending on the timing of the alert.

If alert patterns 104-108 are only associated with a same alert device 50-56 (FIG. 1) at 920, and are not associated with different alert devices 50-56 (FIG. 1) at 940, the method may end at 915 (e.g., with only combining or arbitrating patterns between a same device).

If, in addition to alert patterns 104-108 being associated with a same alert device 50-56 (FIG. 1), alert patterns 104-108 are associated with different alert devices 50-56 (FIG. 1) at 940, the alert patterns 104-108 between the alert devices 50-56 (FIG. 1) are further synchronized or arbitrated at 950 before being generated. For example, the alert devices 50-56 (FIG. 1) can be arbitrated based on a predefined priority scheme to determine a preferred alert device 50-56 (FIG. 1) and the alert pattern 104-108 associated with that alert device 50-56 (FIG. 1) is generated. In another example, visual, auditory, and or haptic alert patterns 104-108 can be synchronized to issue similar patterns (e.g., three visual alert flashes, three haptic seat pulses, and/or three beeps) without the need for arbitration. Thereafter, the method may end at 915 (e.g., with combining or arbitrating patterns of a same device and with synchronizing or arbitrating patterns between different devices).

If, however, alert patterns 104-108 are not associated with a same alert device 50-56 (FIG. 1) at 920, but the alert patterns 104-108 are associated with different alert devices 50-56 (FIG. 1) at 940, the alert patterns 104-108 between the different alert devices 50-56 (FIG. 1) are synchronized or arbitrated at 950, and the method may end at 915 (e.g., with only synchronizing or arbitrating patterns between different devices).

With reference back to FIG. 2, the pattern determination module 78 may further modify the alert patterns 104-108 from the patterns determined from the user configured alert settings 84 and/or the predefined alert settings 110 and/or modify an output of the infotainment system via infotainment signals 116 based on interior vehicle conditions 112 and/or exterior vehicle conditions 114. The interior vehicle conditions 112 can include, but are not limited to, sensed or predicted acoustics of the interior of the vehicle 10 (FIG. 1) that may impact a driver's ability to sense the alert. The exterior vehicle conditions can include, but are not limited to, sensed or predicted acoustics or vibrations of the exterior of the vehicle 10 (FIG. 1) that may impact the driver's ability to sense the alert.

Figure 8:
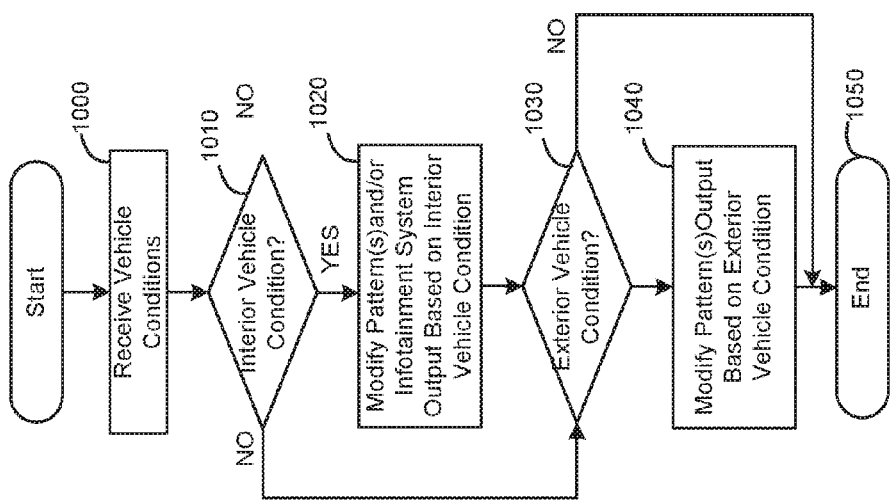

For example, as shown in the FIG. 8 and with continued reference to FIG. 2, the vehicle conditions are received at 1000. If the vehicle conditions are interior vehicle conditions 112 at 1010, the alert patterns 104-108 are modified based on the interior vehicle conditions 112 at 1020. For example, if the evaluation of the interior vehicle conditions 112 indicate the detection of a particular song or music being played on a radio of the infotainment system 56 (FIG. 1), one or more of the haptic alert patterns 104 can be modified by increasing an intensity (e.g., a vibration intensity) based on the presence of low frequency content or radio volume. In another example, if the evaluation of the interior vehicle conditions 112 indicate the detection of a high volume setting of the infotainment system 56 (FIG. 1), a low frequency auditory alert pattern may be superimposed into the auditory content of the infotainment system 56 (FIG. 1) to reinforce the alert that is being communicated by a haptic alert device 50 (FIG. 1).

If the vehicle conditions are interior vehicle conditions 112, alternatively or additionally, the infotainment signals 116 are generated based on the interior vehicle conditions 112 at 1020. For example, if the evaluation of the interior vehicle conditions 112 indicate the detection of a high volume setting of the infotainment system 56 (FIG. 1), the infotainment volume level may be reduced via infotainment signals 116 to a level that is below the auditory alert sound level (e.g., 75 dBA), or the low frequency content (e.g., below 250 Hz) may be eliminated entirely or reduced to improve the driver's ability to perceive a haptic alert via infotainment signals 116.

As can be appreciated, other interior conditions 112 may include, but are not limited to, an output of a driver distraction module, output of a driver workload estimation module (e.g., identifying that the driver is engaged in complex driving maneuvers, identifying if the driver is receiving an incoming call, is in an active call or is receiving urgent maneuver indications from the navigation system), a drowsy driver module, or an enabled state of semi-autonomous driving systems (e.g., cruise control, adaptive cruise control, lane keeping or lane centering system). For example, if the output of the driver distraction module suggest a driver is in a high, prolonged state of distraction, or prolonged state of severe drowsiness, alert patterns can be changed to provide a higher intensity alert (e.g., stronger vibration, louder alert, or brighter visual display) or an earlier alert. Similarly, if the driver is detected to be pressing a touch screen panel with their finger on an infotainment screen (which may indicate the driver's eyes are looking away from the outside traffic scene as they guide their finger to the desired area of the touch screen panel), alert patterns can be changed to provide a higher intensity alert (e.g., stronger vibration, louder alert, or brighter visual display) or even earlier alert.

If, in addition to the vehicle conditions being interior vehicle conditions 112 at 1010, the vehicle conditions are not exterior vehicle conditions 114 at 1030, the method may end at 1050 (e.g., with modifying patterns 104-108 and/or generating infotainment signals 116 only based on interior vehicle conditions 112).

If, in addition to the vehicle conditions being interior vehicle conditions 112 at 1010, the vehicle conditions are exterior vehicle conditions 114 at 1030, the alert patterns 104-108 are further modified based on the exterior vehicle conditions 114 at 1040. For example, if the evaluation of the exterior vehicle conditions 114 indicates the detection of vehicle vibration as indicated by a vehicle suspension system (not shown), the alert patterns 104-108 are modified during rough road conditions. In this example, the patterns 104-108 may be adjusted based on the nature or magnitude of the vibration from the suspension system. For example, if an average magnitude over a predetermined time is determined to exceed some threshold, the alert pattern 104-108 can be adjusted to increase the vibration intensity (e.g., by a discrete value, or a value that is determined based on the magnitude). Thereafter, the method may end at 1050 (e.g., with modifying patterns 104-108 and/or generating infotainment signals 116 based on interior vehicle conditions 112 and with modifying patterns 104-108 based exterior vehicle conditions 114).

If, at 1010 the vehicle conditions are not interior vehicle conditions 112, however, the vehicle conditions are exterior vehicle conditions 114 at 1030, the alert patterns 104-108 are modified based on the exterior vehicle conditions 114 at 1040. Thereafter, the method may end at 1050 (e.g., with modifying patterns 104-108 only based exterior vehicle conditions 114).

As can be appreciated in light of the disclosure, the order of operation within the methods shown in the flowcharts is not limited to the sequential execution as illustrated in the figures, but may be performed in one or more varying orders as applicable and in accordance with the present disclosure. As can further be appreciated, one or more steps of the methods may be added or removed without altering the method. In various embodiments, the methods can be scheduled to run based on predetermined events, and/or can run continually during operation of the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of alerting a driver of a vehicle, comprising:
    receiving alert settings indicating a value associated with at least one alert pattern which indicates an attribute of a signal to be generated, the alert settings configured by a user through a user interface; and
    selectively generating an alert pattern for a haptic alert device, an auditory alert device, a visual alert device, and an infotainment system based on the alert settings,
    wherein the alert settings for the haptic alert device are based on at least one of a duration, a rate, and an intensity,
    wherein the alert settings for the auditory alert device are based on at least one of a duration, a rate, and a frequency,
    wherein the alert settings for the visual alert device are based on at least one of a duration, a location, and a frequency,
    wherein the alert settings from the infotainment system are based on an occurrence of at least one of muting, haptic feedback, pattern display, and a type of at least one of muting, haptic feedback, and pattern display.

2. The method of claim 1, wherein the receiving the alert settings is based on a user selecting at least one of an alert conditions type, a vehicle conditions type, a driving scenarios type, or a group of conditions type of an alert type selection menu of the user interface.

3. The method of claim 1, wherein the receiving the alert settings is based on a user selecting a particular alert condition of an alert condition selection menu of the user interface.

4. The method of claim 1, wherein the receiving the alert settings is based on a user selecting a particular group of conditions of a group of conditions selection menu of the user interface.

5. The method of claim 1, wherein the receiving the alert settings is based on a user selecting a particular driving scenario of a driving scenario selection menu of the user interface.

6. The method of claim 1, wherein the receiving the alert settings is based on a user selecting a vehicle condition of a vehicle conditions selection menu of the user interface.

7. The method of claim 1, wherein the receiving the alert settings is based on a user selecting a driver of a driver selection menu.

8. The method of claim 1, wherein the receiving the alert settings is based on a key fob, where each driver of the vehicle is associated with a different key fob.

9. The method of claim 1, wherein the receiving the alert settings is based on a user selecting an alert device from an alert device selection menu of the user interface.

10. A control system for alerting a driver of a vehicle, comprising:
    a first non-transitory module that receives, by a processor, alert settings indicating a value associated with at least one alert pattern which indicates an attribute of a signal to be generated, the alert settings configured by a user through a user interface; and
    a second non-transitory module that selectively generates, by a processor, an alert pattern for a haptic alert device, an auditory alert device, a visual alert device, and an infotainment system based on the alert settings,
    wherein the alert settings for the haptic alert device are based on at least one of a duration, a rate, and an intensity,
    wherein the alert settings for the auditory alert device are based on at least one of a duration, a rate, and a frequency,
    wherein the alert settings for the visual alert device are based on at least one of a duration, a location, and a frequency,
    wherein the alert settings from the infotainment system are based on an occurrence of at least one of muting, haptic feedback, pattern display, and a type of at least one of muting, haptic feedback, and pattern display.

11. The control system of claim 10, wherein the first non-transitory module receives the alert settings based on a user selecting at least one of an alert conditions type, a vehicle conditions type, a driving scenarios type, or a group of conditions type of an alert type selection menu of the user interface.

12. The control system of claim 10, wherein the first non-transitory module receives the alert settings based on a user selecting a particular alert condition of an alert condition selection menu of the user interface.

13. The control system of claim 10, wherein the first non-transitory module receives the alert settings based on a user selecting a particular group of conditions of a group of conditions selection menu of the user interface.

14. The control system of claim 10, wherein the first non-transitory module receives the alert settings based on a user selecting a particular driving scenario of a driving scenario selection menu of the user interface.

15. The control system of claim 10, wherein the first non-transitory module receives the alert settings based on a user selecting a vehicle condition of a vehicle conditions selection menu of the user interface.

16. The control system of claim 10, wherein the first non-transitory module receives the alert settings based on a user selecting a driver of a driver selection menu.

17. The control system of claim 10, wherein the first non-transitory module receives the alert settings based on a user selecting an alert device from an alert device selection menu of the user interface.

18. A vehicle, comprising:
at least one collision avoidance system that generates conditions data; and
a control module that receives that the conditions data, that receives alert settings indicating a value associated with at least one alert pattern which indicates an attribute of a signal to be generated, the alert settings configured by a user through a user interface, and that generates an alert pattern for at least one of a haptic alert device, an auditory alert device, a visual alert device, and an infotainment system based on the alert settings,
wherein the alert settings for the haptic alert device are based on at least one of a duration, a rate, and an intensity,
wherein the alert settings for the auditory alert device are based on at least one of a duration, a rate, and a frequency,
wherein the alert settings for the visual alert device are based on at least one of a duration, a location, and a frequency,
wherein the alert settings from the infotainment system are based on an occurrence of at least one of muting, haptic feedback, pattern display, and a type of at least one of muting, haptic feedback, and pattern display.

* * * * *